United States Patent [19]
Braun et al.

[11] 3,931,874
[45] Jan. 13, 1976

[54] SELF-ACTUATING FRICTION-CLUTCH ASSEMBLY

[75] Inventors: Siegfried Braun, Friedrichshafen; Fritz Herbst, Bermatingen, both of Germany

[73] Assignee: Zahnradfabrik Friedrichshafen AG, Friedrichshafen, Germany

[22] Filed: Oct. 29, 1974

[21] Appl. No.: 519,001

[30] Foreign Application Priority Data
Oct. 27, 1973   Germany............................ 2353983

[52] U.S. Cl. ............ 192/54; 192/48.91; 192/70.23; 192/93 A
[51] Int. Cl.² ............................................ F16D 7/00
[58] Field of Search ..... 192/54, 48.91, 70.23, 93 A, 192/109 B

[56] References Cited
UNITED STATES PATENTS

| | | | |
|---|---|---|---|
| 2,081,824 | 5/1937 | Lambert ...................... | 192/70.23 X |
| 2,658,593 | 11/1953 | Doebeli........................... | 192/48.91 |
| 2,827,994 | 3/1968 | Tiedeman et al................ | 192/93 A |
| 3,118,292 | 1/1964 | Schroter et al. ...................... | 192/54 |
| 3,203,525 | 8/1965 | Herbst .............. | 192/93 A |
| 3,703,226 | 11/1972 | Strehler ................. | 192/54 |

FOREIGN PATENTS OR APPLICATIONS
1,625,849   12/1967   Germany .............. 192/54

*Primary Examiner*—Samuel Scott
*Assistant Examiner*—Randall Heald
*Attorney, Agent, or Firm*—Karl F. Ross; Herbert Dubno

[57] ABSTRACT

A generally cylindrical supporting body rigid with a rotating drive shaft carries an axially slidable sleeve controlling the selective entrainment of a pair of flanking gears through respective clutches interposed between these gears and the body, each clutch comprising an annular pressure plate limitedly rotatable and axially slidable with reference to the body. Rollers journaled on radial pins along the periphery of the supporting body coact with respective cam tracks of the plate surfaces to urge either of these plates toward the adjoining gear, thereby engaging the interposed clutch, upon retardation of the plate with reference to the body by incipient contact of the corresponding clutch elements. The sleeve has substantially T-shaped grooves receiving, with play, camming heads on the pressure plates which help realign a lagging pressure plate with the supporting body upon restoration of the control sleeve to a neutral position, thereby facilitating release of the clutch; the cam track is arcuately curved to decrease the ratio of torque intensification on the engagement stroke and, in turn, to facilitate initiation of the disengagement stroke by an axial shift of the sleeve until the camming heads on the pressure plates go into action.

10 Claims, 3 Drawing Figures

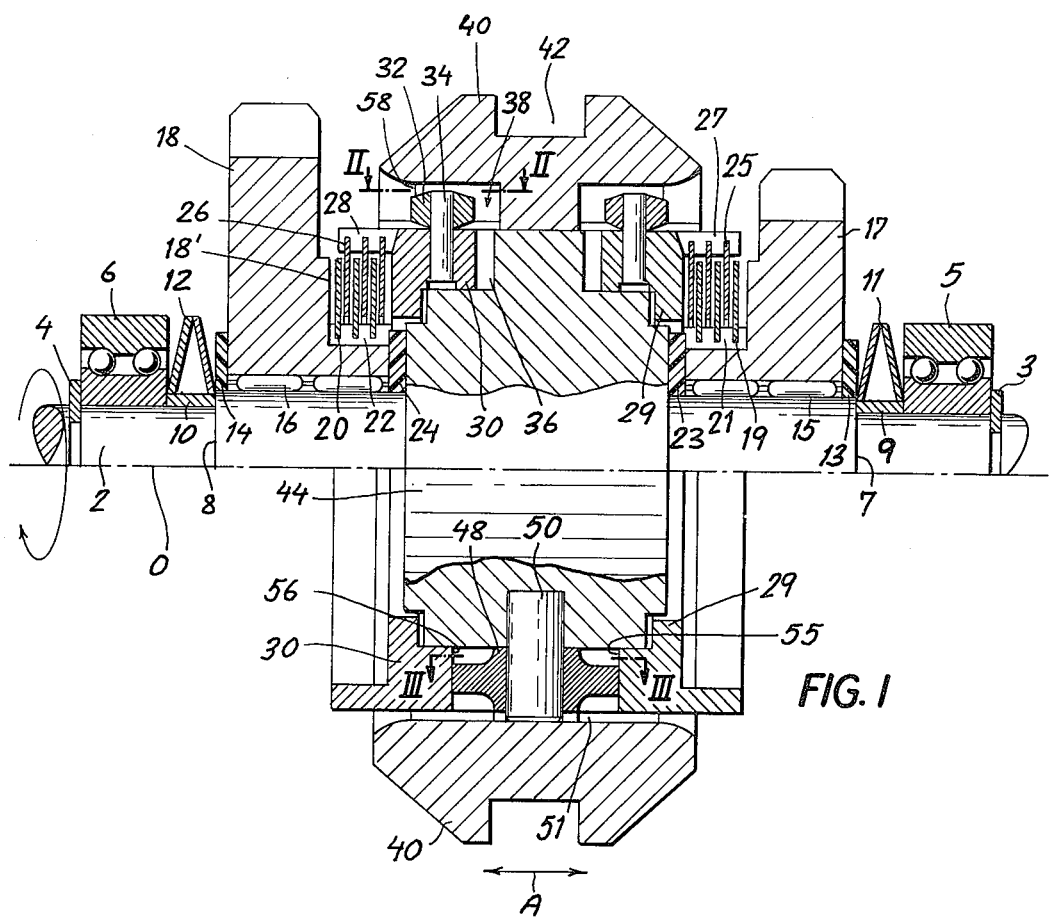
FIG. 1
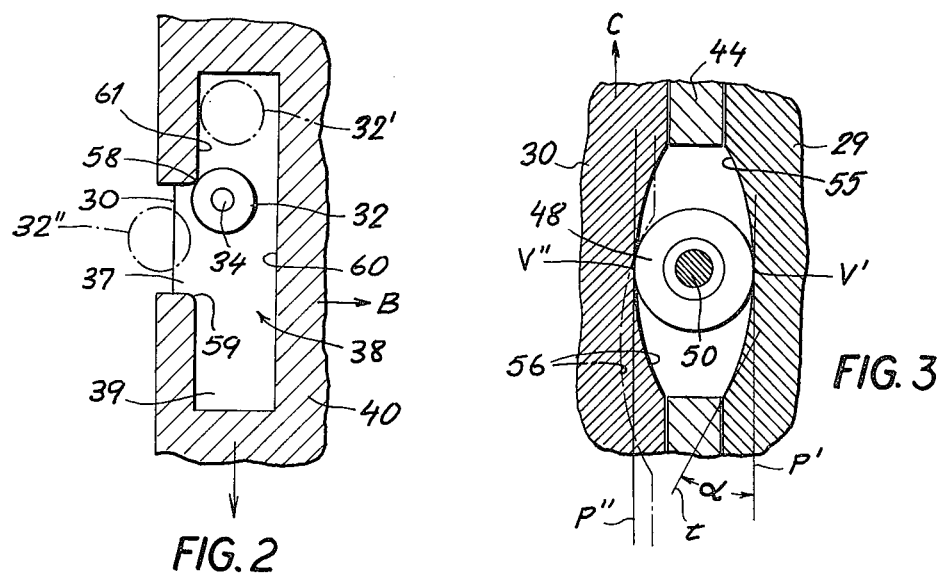
FIG. 2
FIG. 3

SELF-ACTUATING FRICTION-CLUTCH ASSEMBLY

FIELD OF THE INVENTION

Our present invention relates to a self-actuating friction-clutch assembly adapted to be used for heavy-duty torque transmission, e.g. in a drive for power boats.

BACKGROUND OF THE INVENTION

From commonly owned German patent specifications Nos. 1,261,360 and 1,625,849 it is known to provide a self-actuating clutch for the purpose of temporarily coupling a motor-driven shaft with a transmission member such as a spur gear freely rotatable on that shaft, the clutch including a ring with a beveled inner friction surface coacting with a complementarily beveled friction surface on the gear hub for rotatively entraining same when the ring is axially shifted from a normal disengaged position toward the gear. Such a shift is brought about by a control sleeve which is slidably but nonrotatable mounted on a generally cylindrical supporting body rigid with the shaft, this body being provided with a set of angularly equispaced radial pins carrying rollers which engage generally V-shaped sections of a cam track on a face of the clutch ring remote from the associated transmission member. The control sleeve has its inner peripheral surface formed with a set of angularly equispaced, peripherally extending grooves engaged by respective studs rising from the clutch ring to enable displacement of that ring by an axial shift of the sleeve; and clutch ring is limitedly rotatable relatively to the sleeve-supporting body but is normally held in a predetermined angular position with reference to that body by the V-shaped cam-track sections and a set of springs axially drawing the ring toward the body. The spring force also tends to hold the control sleeve in a neutral position from which it can be axially shifted to engage the clutch by establishing contact between the two coacting friction surfaces. This contact need only suffice to exert a certain drag upon the clutch ring (it being assumed that the shaft rotates faster than the gear) so as to cause a limited rotation of the ring relative to the sleeve support. The shape of the cam track translates this relative rotation into a further axial shift of the ring, proportional to the angle of rotation, which intensifies the frictional engagement and therefore the transmitted torque.

In the case of a double-clutch assembly, in which the sleeve support is bracketed by two clutch rings confronting respective transmission members, the grooves of the sleeve are duplicated at opposite ends thereof to receive respective sets of studs from the two clutch rings. In that case it is necessary to provide these grooves with a spur adapted to receive the associated stud in the normal angular position of the corresponding ring to allow a shifting of the sleeve in the opposite axial direction. To facilitate bidirectional rotation, the grooves are substantially T-shaped with the spur consisting the stem of the "T".

In this known system each stud fits closely into the associated groove, or at least into the peripherally extending leg thereof, so that the sleeve fully participates in the axial excursion of the engaged clutch ring. To disengage the clutch constituted by this ring and the coacting gear hub, the sleeve must be brought bact to its neutral position by a reverse axial shift which has to overcome the reaction force of the cam track and the associated rollers on the sleeve support as long as the ring is in an off-normal angular position relative to that support. The reaction force to be overcome is a function of the driving torque applied to the shaft so that disengagement of the clutch is possible only with low or zero torque, i.e. with the motor sharply braked or disconnected from the shaft. This is true even where, as in the system described in the second one of the two German patent specifications referred to above, the gears to be entrained are axially shiftable on the shaft in a direction away from the sleeve support, against the force of prestressed retaining springs which limit the contact pressure between the coacting friction surfaces of the engaged clutch.

OBJECTS OF THE INVENTION

An important object of our present invention, therefore, is to provide an improved clutch assembly of the aforedescribed character allowing the release under load of an engaged clutch.

A related object is to provide means in such a clutch assembly enabling a softer engagement of the clutch in comparison with the prior systems.

SUMMARY OF THE INVENTION

A system according to our invention, usable not only for selectively coupling a transmission member to a driven shaft but also more generally for temporarily interconnecting any two coaxial members for joint rotation, comprises a supporting body rigid with one of these members (referred to hereinafter as the shaft) axially spaced from the other member (referred to hereinafter as the gear). A transverse pressure plate on the supporting body is separtated by a gap from the gear and is mounted on that body with freedom of limited relative axial and angular displacement; this plate may be of annular shape, like the clutch ring of the aforedescribed German patent specifications, if the shaft traverses the gear. The pressure plate and the gear are provided with first and second friction means which are operatively interengageable upon an axial shifting of the plate toward the confronting gear from a normal, withdrawn position, this shifting being effected by a control member such as the aforedescribed sleeve carried on the supporting body in fixed relative angular position. Up to this point, the system is comparable to those of the two German patent specifications.

In contradistinction to these earlier systems, however, the axial shift of the pressure plate in a system according to our invention — under the control of first coacting cam means on that plate and on the supporting body — is not a linear function of the relative rotation of these two elements but proceeds at a progressively increasing rate with reference to the rate of this relative rotation. This increase in the relative rate of displacement, on the other hand, entails a progressive reduction of the effective moment arm and therefore in the rate of intensification of the transmitted torque, the intensification factor being the quotient of the product of contact pressure, mean radius of the clutch elements, number of friction surfaces and overall frictional coefficient divided by the driving torque applied to the shaft; that factor must always be greater than 1 if slipping of the clutch is to be prevented. The overall frictional coefficient includes the frictional coefficient of the clutch elements, which is substantially constant once contact has been established, and that of the first coacting cam means (cam track and rollers), which is less during relative motion than at relative standstill. Since slippage of the clutch must be prevented during the engagement stroke, the intensification factor must exceed unity at the beginning of the engagement stroke when the difference in angular velocity between the driving and driven members — and therefore the applied torque — is greatest, yet this leads to an excessive torque intensification at the end of that stroke if the effective moment arm is constant throughout the stroke (as in the systems of the German specifications referred to) since the contact pressure is a function of that moment arm. The reduction in moment arm pursuant to our invention, realized by a suitable curving of the cam track, facilitates disengagement by decreasing the intensification factor at the end of the engagement stroke. On the disengagement stroke, however, the intensification factor increases and a point is eventually reached where the curved track presents a cam angle so small as to prevent the completion of the stroke by the mere exertion of a continued axial thrust upon the control member or sleeve. Therefore, pursuant to another important feature of our invention, the coupling between the control member and the pressure plate includes second coacting cam means, such as an internal corner of the sleeve engageable with a convex surface of a projection on the plate, the accelerating a reversal of the rotary disalignment of the plate and the supporting body during the disengagement stroke, especially during its terminal phase.

Thus, the cam angle may actually be zero in the normal rotary position of the pressure plate relative to the supporting body, i.e. the arcuate track surface in the vicinity of each coacting roller may be concave toward that roller and tangent to a plane transverse to the shaft axis at a vertex point contacted by the roller in the normal rotary position. This track shape imparts to the roller a harmonic motion with a soft cut-in of the clutch as the axial shift due to relative angular displacement of the coacting members is initially zero.

Advantageously, according to a further feature of our invention, the coupling between the pressure plate and the control sleeve is of the lost-motion type enabling the final phase of the engagement stroke to proceed without axial entrainment of the control sleeve which therefore can be limited in its axial mobility. The projection forming part of that coupling may engage in a groove on the inner peripheral sleeve surface having a peripherally extending and an axially extending leg, as in the system of the two German patent specifications, except that the peripherally extending leg is substantially wider than the engaging projection; thus, the groove may be generally T-shaped, with bidirectional rotation, or L-shaped if only unidirectional rotation is required. The camming edge coacting with the convex projection surface, which is turned toward the gear, is then formed by the junction between the two legs; the projection, advantageously, takes the form of a stud with a rounded head of cylindrical, toroidal or spherical shape which is preferably journaled on the stud for free rotation.

BRIEF DESCRIPTION OF THE DRAWING

The above and other features of our invention will now be described in detail with reference to the accompanying drawing in which:

FIG. 1 is an axial sectional view of the upper half and part of the lower half of a friction-clutch assembly embodying our invention; and FIGS. 2 and 3 are sectional detail views drawn to a larger scale, taken respectively on lines II — II and III — III of FIG. 1.

SPECIFIC DESCRIPTION

The double-clutch system shown in the drawing comprises a continuously rotating shaft 2, driven by a nonillustrated motor or engine, rigid with a generally cylindrical supporting body 44 which is flanked by a pair of spur gears 17 and 18. These gears, centered on an axis O, are part of respective power trains designed to transmit the engine torque at different speed ratios to a load such as, for example, a ship's propeller. The gears are shown to be of different size and can be alternately entrained by the supporting body 44 with the aid of interposed friction clutches including a pair of annular pressure plates 29 and 30, these pressure plates being seated on body 44 with freedom of limited axial and angular displacement. Centering springs (not shown) may serve to draw the plates 29 and 30 toward each other and therefore onto body 44, thereby preventing accidental engagement of either clutch.

In the illustrated embodiment, the clutches are of the multidisk type comprising two sets of interleaved annular friction disks 19, 25 in the case of the right-hand clutch, interposed between gear 17 and pressure plate 29, and two similar sets 20 and 26 in the case of the left-hand clutch, interposed between gear 18 and pressure plate 30. Disks 19 and 20 have internal guide slots receiving axially extending ribs 21 and 22 on the hubs of gears 17 and 18, respectively; disks 25 and 26 have internal guide slots receiving lugs 27 and 28, respectively, which project axially from plates 29 and 30. The disks of each clutch, as well understood in the art, are normally separated from one another so that the associated pressure plates and gears are mutually decoupled; upon the movement of either pressure plate toward the corresponding gear, the friction disks engage one another and transmit the rotation of the pressure plate to the gear.

The gears 17 and 18 ride on roller bearings 15 and 16 between pairs of Teflon rings 13, 23 and 14, 24 which are slidable on a large-diameter portion of shaft 2 separated by shoulders 7 and 8 from a pair of reduced extremities journaled in ball bearings 5 and 6, these ball bearings being supported in a nonillustrated transmission housing. The inner bearing races, resting against respective split rings 3 and 4, are separated from shoulders 7 and 8 by ferrules 9 and 10 and from fixed outer abutments for two Belleville springs 11 and 12 held under prestress between these races and fixed inner stops constituted by shoulder 7 and 8. In the normal axial position of gears 17 and 18, rings 13 and 14 lie flush with the shoulders 7 and 8 so that no pressure is exerted on them by the springs 11 and 12. Upon an outward shifting of the respective clutch ring 29 or 30 under the control of a sleeve 40, as more fully described hereinafter, pressure exerted upon the respective gear 17 or 18 through the intervening friction-disk array displaces the corresponding ring 13 or 14 to compress the associated spring 11 or 12 which thereupon resists further axial displacement of the gear and the ring. Naturally, the stroke of such axial displacement will always be less than the width of ring 13 or 14 which thus remains emplaced on the intermediate part of shaft 2.

Sleeve 40 is provided with a peripheral groove 42 engageable by a nonillustrated fork to permit an axial shifting thereof in either direction as indicated by an arrow A in FIG. 1. The sleeve is held against rotation relative to body 44 by a set of angularly equispaced radial pins 50 (only one shown) which enter into axial inner grooves 51 of the sleeve and also serve as carriers for respective rollers 48 journaled thereon. Each roller 40 coacts with two concave surfaces 55 and 56 of pressure plates 29 and 30, constituting segments of a pair of annular cam tracks, as best seen in FIG. 3. In the normal relative angular position of body 44 and plates 29, 30, illustrated in full lines, roller 48 contacts the track segments 55 and 56 at vertex points V' and V'' where the curves are tangent to respective planes P' and P'' perpendicular to the axis O of shaft 2. At their points farthest from these vertices, the tangents $t$ include with these transverse planes an acute angle $\alpha$ here shown to be approximately equal to 30°.

Sleeve 40 is linked with the two pressure plates 29, 30 through a pair of identical and symmetrical lost-motion couplings to be described hereinafter with particular reference to plate 30. The inner peripheral sleeve surface is provided at each end with a set of angularly equispaced grooves 38, only one groove of each set being shown. These grooves are angularly offset from the rollers 48 and, as clearly seen in FIG. 2, are substantially T-shaped with an axially extending leg 37 and a peripherally extending leg 39. Studs 34, rising radially from pressure plates 29 and 30, project into the grooves 38 and carry rounded heads 32 which are preferably rotatably jornaled thereon.

Legs 37 and 39 of grooves 38 meet at corners 58, 59, which may be sharp or slightly rounded, exerting a camming action upon the head 32 when the sleeve 40 and the plate 30 (or 29) are in relative position in which the head and the corner engage each other as illustrated in full lines in FIG. 2. In this position of engagement, a thrust (arrow B, FIG. 2) exerted upon sleeve 40 in a direction away from the associated gear 18 (or 17) cams the head 32 toward the central leg 37 of the groove, thereby causing the plate 30 (or 29) to move in the direction of arrow C, FIG. 3, with reference to body 44 and rollers 48. This camming engagement occurs in an off-normal angular position of the pressure plate, as indicated in dot-dash lines in FIG. 3, in which the roller 48 bears upon its track surface 56 (or 55) at a point where the tangent to that surface includes with the transverse direction of planes P' and P'' an arcuate angle which is somewhat less than the maximum angle $\alpha$ but is still considerably larger than zero. The peripheral length of groove 38 may exceed that of track sections 55 and 56 by about the diameter of head 32.

Engagement of clutch 20, 26, 30 to entrain the gear 18 requires only a slight leftward shift of sleeve 40 from its neutral position shown in FIG. 1. At this stage all the heads 32 on plate 30 are in contact with edges 60 of associated grooves 38 whereby that plate is axially shifted along with the sleeve, such a shift eliminating the existing gaps between plate 30, disks 20, 26 and a confronting face 18' of the gear. With the gear held stationary by the load connected thereto, or rotating at a reduced rate with reference to shaft 2, this incipient engagement of the clutch retards the plate 30 with reference to body 44 with which it had up to then been angularly aligned in the position shown in full lines in FIG. 3. Such a retardation causes a disalignment of plate 30 with reference to body 44, in the direction opposite to that of arrow C, whereby roller 48 exerts a camming force upon track 56 so as to shift the plate 30 further to the left. If the torque applied to shaft 2 by the engine is sufficient to drive the plate 30 past the angular position shown in dot-dash lines in FIG. 3, this shift will be communicated to the gear 18 and the ring 14 with compression of Belleville spring 12 which yields to limit the compression of the clutch disks, its prestress thus determining the maximum transmitted torque. It will be noted that in this angular range of plate 30 relative to body 44 the angle $\alpha$ reaches substantial values which on the one hand reduce the effective moment arm of the camming mechanisms 48, 56 and, on the other hand, facilitate a return of plate 30 to at least the dot-dash position by a reverse axial thrust exerted upon that plate.

It will be noted from FIG. 2 that the width of groove leg 38 considerably exceeds the diameter of head 32, the difference allowing the roller 30 to shift outwardly under the control of the camming mechanism of FIG. 3 with little or no axial entrainment of sleeve 40. At the end of this outward shift, the head 30 contacts an edge 61 of groove 38 as illustrated in dot-dash lines at 32'; the length of the peripheral leg 39 of this groove limits the angular excursion of plate 30 relative to body 44. On the disengagement stroke (arrow B), curve 56 finds sufficient purchase on roller 48 to establish the phantom-line position of FIG. 3 in which the corner 58 in FIG. 2 has an effective moment arm with reference to the axis of stud 34 as it engages the head 32 thereof in the manner indicated in full lines. Thus, even though the spring 12 ceases at about this point to assist in the restoration of the clutch elements to their normal position shown in FIG. 1, no substantial increase in the exerted thrust will be necessary in order to realign the head 34 with the leg 37 of groove 38 while bringing about approximately the relative position of the parts shown in full lines in FIG. 3. If the groove leg 37 is wider than the head 32, as illustrated in FIG. 2, an exact centering of the head 32 with reference to groove 38 may be brought about, for example, by an array of spring-loaded ball checks in the midplane of body 44 engaging in inner peripheral notches of sleeve 40 as shown in German patent specification No. 1,261,360; such bell checks can also serve to index the sleeve 42 in its neutral and its axially shifted working positions. The centering of the head 32 in groove 38 in the disengaged clutch position is, however, not essential; it is merely necessary that the head 32 can escape into the leg 37 when the sleeve 40 is shifted from neutral into its opposite working position, to engage the clutch 19, 25, 29, as shown at 32''.

It is also not indispensable that the head 32 of stud 34 be rotatably mounted thereon; if it forms an internal extension of that stud, only its left side (as viewed in FIG. 2) need be convex whereas the opposite side, engageable by edge 60, may be flat or of any other convenient shape.

It will thus be seen that we have provided an improved friction-clutch assembly of the self-actuating or torque-intensifying type which can be disengaged with the application of moderate force only, even under load, to permit quick maneuvering and avoidance of obstacles as may be encountered, for example, in the navigation of power boats.

We claim:

1. A self-actuating friction-clutch assembly for temporarily interconnecting two coaxial members for joint rotation, comprising:

a body rigid with one of said members axially spaced from the other of said members;

a transverse pressure plate on said body confronting said other of said members across an intervening gap, said pressure plate being mounted on said body with freedom of limited relative axial and angular displacement;

first and second friction means in said gap respectively connected with said pressure plate and with said other of said members for operative interengagement upon an axial shift of said pressure plate toward said other of said members from a normal position in which said first and second friction means are spaced apart;

an axially shiftable control member mounted on said body in fixed relative angular position;

coupling means linking said control member with said pressure plate for shifting the latter toward said other of said members upon a displacement of said control member from a neutral position, with resulting interengagement of said first and second friction means sufficient to translate relative rotation of said members into a rotary disalignment of said pressure plate and said body from a normal relative rotary position;

first coacting cam means on said body and on said pressure plate for continuing the axial shift of said pressure plate in response to said rotary disalignment at a progressively increasing rate with reference to the rate of relative rotation, thereby intensifying the interengagement of said first and second friction means; and second coacting cam means in said coupling means for accelerating a reversal of said rotary disalignment upon separation of said first and second friction means by a return of said control means to said neutral position.

2. A friction-clutch assembly as defined in claim 1 wherein said coupling means comprises a substantially radial projection on said pressure plate with a convex surface confronting said other of said members, said control member being provided with a groove having a peripherally extending leg substantially wider than said projection and an axially extending leg at least as wide as said projection, said projection extending into said groove, said second coacting cam means including an internal corner of said control member at a junction of said legs engaging said convex surface in an off-normal relative rotary position of said pressure plate and said body.

3. A friction-clutch assembly as defined in claim 2 wherein said groove is generally T-shaped with said axially extending leg terminating at a midpoint of said peripherally extending leg, thereby enabling bidirectional relative rotation of said pressure plate and said body from said normal relative rotary position.

4. A friction-clutch assembly as defined in claim 2 wherein said projection comprises a stud and a rounded head journaled on said stud.

5. A friction-clutch assembly as defined in claim 1 wherein said first coacting cam means comprises a radial pin on said body and a roller journaled on said pin, said pressure plate having a track with a concave surface engaging said roller, said concave surface being substantially tangent to a plane transverse to the common axis of said members at a vertex point contacted by said roller in said normal relative rotary position.

6. A friction-clutch assembly as defined in claim 5, further comprising prestressed resilient means linked with said one of said members and bearing upon said other of said members, the latter being limitedly axially shiftable against the force of said resilient means by pressure exerted upon said other of said members from said pressure plate through said first and second friction means.

7. A self-actuating friction-clutch assembly comprising:

a motor-driven shaft;

a generally cylindrical body rigid with said shaft;

a pair of transmission members on opposite sides of and coaxial with said body traversed by said shaft with freedom of relative rotation;

a pair of annular pressure plates coaxially flanking said body and confronting said transmission members with freedom of limited axial and angular displacement relative to said body;

a pair of friction clutches respectively interposed between said pressure plates and said transmission members, said friction clutches being disengaged in axial positions of said pressure plates close to said body and being progressively engageable upon axial shifting of the respective pressure plates away from said body;

an axially shiftable sleeve mounted on said body in fixed relative angular position;

a lost-motion coupling linking said sleeve with each of said pressure plates for shifting either of said pressure plates toward the confronting transmission member upon a displacement of said sleeve in a corresponding direction from a neutral position, with resulting engagement for the corresponding clutch sufficient to exert a drag upon the respective pressure plate disaligning same from a normal rotary position relative to said body;

first coacting cam means on said body and on said pressure plates for continuing the axial shift of either pressure plate toward the confronting transmission member upon rotary disalignment thereof due to said drag, at a progressively increasing rate with reference to the rate of said rotary disalignment, thereby intensifying the engagement of the corresponding clutch; and second coacting cam means in said lost-motion coupling for accelerating a reversal of said rotary disalignment upon incipient disengagement of said corresponding clutch by a return of said sleeve in said neutral position.

8. A friction-clutch assembly as defined in claim 7 wherein said pressure plates have arcuate track surfaces concave toward a common transverse plane bisecting said body, said first coacting cam means comprising a radial pin on said body and a roller journaled on said pin in contact with said track surfaces.

9. A friction-clutch assembly as defined in claim 8 wherein said lost-motion coupling comprises a substantially radial projection on each pressure plate with a convex surface at least on a side facing away from said body, said sleeve being provided on its inner peripheral surface with a pair of generally T-shaped grooves symmetrically disposed at opposite sides thereof and respectively engaged by said projections, each of said grooves having a peripherally extending leg wider than said projections and an axially extending leg at least as wide as said projections terminating at a midpoint of said peripherally extending leg, said second coacting cam means including an edge of said sleeve at a junction of said legs engaging said convex surface in an off-normal relative rotary position of the respective pressure plate in which said track surface thereof bears upon said roller at a point at which a tangent in said track surface includes an acute angle with said common transverse plane.

10. A friction-clutch assembly as defined in claim 9 wherein said transmission members are axially slidable on said shaft, further comprising a pair of abutments on said shaft bracketing said transmission members, a pair of stops on said shafts axially inwardly of said abutments but beyond said transmission members, and prestressed springs inserted between said abutments and said stops in contact with said transmission members for resisting outward shifting thereof from a normal axial position, said pressure plates being restorable by said springs to said normal axial position substantially concurrently with the engagement of said edge of said sleeve with said convex surface of the respective projection.

* * * * *